(12) United States Patent
Honjo et al.

(10) Patent No.: US 12,034,136 B2
(45) Date of Patent: Jul. 9, 2024

(54) VEHICLE

(71) Applicant: HONDA MOTOR CO., LTD., Tokyo (JP)

(72) Inventors: Takuya Honjo, Saitama (JP); Daisuke Takeuchi, Saitama (JP); Daisuke Komazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 601 days.

(21) Appl. No.: 17/416,847

(22) PCT Filed: Dec. 21, 2018

(86) PCT No.: PCT/JP2018/047378
§ 371 (c)(1),
(2) Date: Jun. 21, 2021

(87) PCT Pub. No.: WO2020/129260
PCT Pub. Date: Jun. 25, 2020

(65) Prior Publication Data
US 2022/0085435 A1 Mar. 17, 2022

(51) Int. Cl.
*H01M 10/633* (2014.01)
*B60H 1/00* (2006.01)
(Continued)

(52) U.S. Cl.
CPC ...... *H01M 10/633* (2015.04); *B60H 1/00278* (2013.01); *H01M 10/625* (2015.04);
(Continued)

(58) Field of Classification Search
CPC ............. H01M 10/633; H01M 10/625; H01M 10/6568; H01M 10/663; H01M 2220/20; B60H 2001/00307; B60H 1/00278
See application file for complete search history.

(56) References Cited

U.S. PATENT DOCUMENTS

2009/0241573 A1  10/2009  Ikegami et al.
2011/0113800 A1   5/2011  Sekiya et al.
(Continued)

FOREIGN PATENT DOCUMENTS

CN       101545690 A     9/2009
CN       102059932 A     5/2011
(Continued)

OTHER PUBLICATIONS

Machine Translation of WO-2019182079-A1 (Jan. 25, 2024) (Year: 2024).*
(Continued)

*Primary Examiner* — Matthew J Merkling
(74) *Attorney, Agent, or Firm* — Paratus Law Group, PLLC

(57) ABSTRACT

A vehicle includes a battery, an air conditioner, a first temperature adjustment circuit including a first pump and a chiller, a second temperature adjustment circuit including a second pump and a radiator, a coupling passage configured to connect the first temperature adjustment circuit and the second temperature adjustment circuit to form a coupling circuit, an electromagnetic switching valve configured to switch between a circulation state in which the heat medium can circulate through the coupling circuit and a non-circulation state in which the heat medium cannot circulate through the coupling circuit, a first temperature sensor configured to acquire a temperature of the battery, and a control device configured to select a mode based on at least the temperature of the battery. The control device performs a control based on a basic control map after selecting a series mode of a special control map.

10 Claims, 11 Drawing Sheets

(51) Int. Cl.
*H01M 10/625* (2014.01)
*H01M 10/6568* (2014.01)
*H01M 10/663* (2014.01)

(52) U.S. Cl.
CPC ..... *H01M 10/6568* (2015.04); *H01M 10/663* (2015.04); *B60H 2001/00307* (2013.01); *H01M 2220/20* (2013.01)

(56) References Cited

U.S. PATENT DOCUMENTS

| | | | |
|---|---|---|---|
| 2011/0296855 A1 | 12/2011 | Johnston et al. | |
| 2012/0159986 A1* | 6/2012 | Imanishi | B60L 1/003 |
| | | | 62/498 |
| 2012/0180997 A1 | 7/2012 | Johnston et al. | |
| 2012/0183815 A1 | 7/2012 | Johnston et al. | |
| 2012/0222438 A1* | 9/2012 | Osaka | B60H 1/00764 |
| | | | 62/126 |
| 2012/0222446 A1* | 9/2012 | Sekiya | B60L 50/51 |
| | | | 62/498 |
| 2012/0241139 A1 | 9/2012 | Katoh et al. | |
| 2014/0174708 A1* | 6/2014 | Akiyama | B60H 1/00278 |
| | | | 165/42 |
| 2014/0311180 A1 | 10/2014 | Kawakami et al. | |
| 2017/0197488 A1 | 7/2017 | Kim et al. | |
| 2018/0072130 A1 | 3/2018 | Kim | |
| 2019/0030991 A1 | 1/2019 | Enomoto et al. | |
| 2020/0313255 A1* | 10/2020 | Wu | B60H 1/323 |
| 2023/0076394 A1* | 3/2023 | Yeomans | B60H 1/00392 |

FOREIGN PATENT DOCUMENTS

| | | | | |
|---|---|---|---|---|
| CN | 102275521 | A | 12/2011 | |
| CN | 108778797 | A | 11/2018 | |
| EP | 2392486 | A2 | 12/2011 | |
| EP | 3069910 | A2 | 9/2016 | |
| JP | 2010-272289 | A | 12/2010 | |
| JP | 2013-104652 | A | 5/2013 | |
| JP | 2013-188098 | A | 9/2013 | |
| JP | 2018-043741 | A | 3/2018 | |
| WO | WO-2019182079 | A1 * | 9/2019 | ......... B60H 1/00278 |

OTHER PUBLICATIONS

Mar. 4, 2022, Indian Examination Report issued for related IN Application No. 202147027308.
Mar. 12, 2019, International Search Report issued for related PCT application No. PCT/JP2018/047378.
Mar. 12, 2019, International Search Opinion issued for related PCT application No. PCT/JP2018/047378.
Jul. 22, 2023, Translation of Chinese Office Action issued for related CN Application No. 201880100374.7.

* cited by examiner

VEHICLE

CROSS REFERENCE TO PRIOR APPLICATION

This application is a National Stage Patent Application of PCT International Patent Application No. PCT/JP2018/047378 (filed on Dec. 21, 2018) under 35 U.S.C. § 371, which is hereby incorporated by reference in its entirety.

TECHNICAL FIELD

The present invention relates to a vehicle which performs temperature adjustment of a battery and a power conversion device.

BACKGROUND ART

There has been known an electric vehicle which includes a first temperature adjustment circuit, a second temperature adjustment circuit, a pump which circulates a heat medium in at least one of the first temperature adjustment circuit and the second temperature adjustment circuit, a coupling passage which connects the first temperature adjustment circuit and the second temperature adjustment circuit to form a coupling circuit, and a switching unit which can switch between a circulation state, in which the heat medium circulates through the coupling circuit, and a non-circulation state, in which the heat medium does not circulate through the coupling circuit.

For example, Patent Literature 1 discloses that in an electric vehicle including a cooling circuit for cooling a battery, a cooling circuit for cooling an inverter, a first refrigerant pump provided in the cooling circuit for cooling the battery, a second refrigerant pump provided in the cooling circuit for cooling the inverter, and a switching valve which switches between a state in which temperatures of the battery and the inverter are adjusted in the same circuit (hereinafter also referred to as a "circulation state") and a state in which the temperatures of the battery and the inverter are adjusted by separate circuits (hereinafter also referred to as a "non-circulation state"), when an outside air temperature is lower than a predetermined temperature, the circulation state is set, and when the outside air temperature is equal to or higher than the predetermined temperature, the non-circulation state is set, so that accuracy of the temperature adjustment is increased.

CITATION LIST

Patent Literature

Patent Literature 1: JP-A-2013-188098

SUMMARY OF INVENTION

Technical Problem

However, in the electric vehicle disclosed in Patent Literature 1, since the circulation state and the non-circulation state are switched in accordance with the outside air temperature, there is a concern that temperatures of the battery and the power conversion device cannot be appropriately cooled due to a change in the outside air temperature. In addition, switching between the circulation state and the non-circulation state frequently occurs due to the change in the outside air temperature, and a product life may be shortened due to a load of a switching unit, or an extra operating noise may be generated. On the other hand, it is preferable that an amount of power consumption in the temperature adjustment of the battery and the power conversion device is small.

An object of the present invention is to provide a vehicle capable of appropriately adjusting temperatures of a battery and a power conversion device while suppressing an influence of an outside air temperature, suppressing an amount of power consumption, and suppressing frequent occurrence of switching of modes.

Solution to Problem

According to the present invention, there is provided a vehicle including:
 a battery;
 an air conditioner;
 a first temperature adjustment circuit including a first pump configured to supply a heat medium to the battery and a first heat exchange unit configured to exchange heat between the heat medium and a heat medium for air conditioning;
 a second temperature adjustment circuit including a second pump configured to supply the heat medium to a power conversion device and a second heat exchange unit configured to exchange heat between the heat medium and an outside air;
 a coupling passage configured to connect the first temperature adjustment circuit and the second temperature adjustment circuit to form a coupling circuit;
 a switching unit configured to switch between a circulation state in which the heat medium is capable of circulating through the coupling circuit and a non-circulation state in which the heat medium is not capable of circulating through the coupling circuit;
 a first temperature acquisition unit configured to acquire a first temperature which is a temperature of the battery; and
 a control device configured to select any one mode of a plurality of modes based on at least the first temperature,
 wherein the plurality of modes include:
  a series mode in which, in the circulation state, the heat medium is circulated in the coupling circuit in a state in which the first heat exchange unit is not capable of exchanging heat between the heat medium and the heat medium for air conditioning, and
  a separate mode in which the heat medium is circulated at least in the second temperature adjustment circuit in the non-circulation state,
 wherein the control device includes a plurality of control maps,
 wherein the plurality of control maps include:
  a basic control map including the series mode and the separate mode; and
  a special control map including the series mode and the separate mode, the special control map having an area of the series mode narrower than the basic control map, and
 wherein the control device is configured to,
  when the first temperature is within a predetermined temperature range, perform a control based on the basic control map, and
  when the first temperature is out of the predetermined temperature range, perform a control based on the special control map, and after the series mode of the special control map is selected, perform a control based on the basic control map.

Advantageous Effects of Invention

According to the present invention, temperatures of the battery and the power conversion device can be appropriately adjusted while suppressing an influence of an outside air temperature. In addition, when the temperatures of the battery and the power conversion device are appropriately adjusted, an amount of power consumption can be suppressed and frequent occurrence of switching of the mode can be suppressed.

DESCRIPTION OF EMBODIMENTS

Hereinafter, an embodiment of the present invention will be described with reference to FIGS. 1 to 11.

[Temperature Adjustment Circuit]

Figure 1:
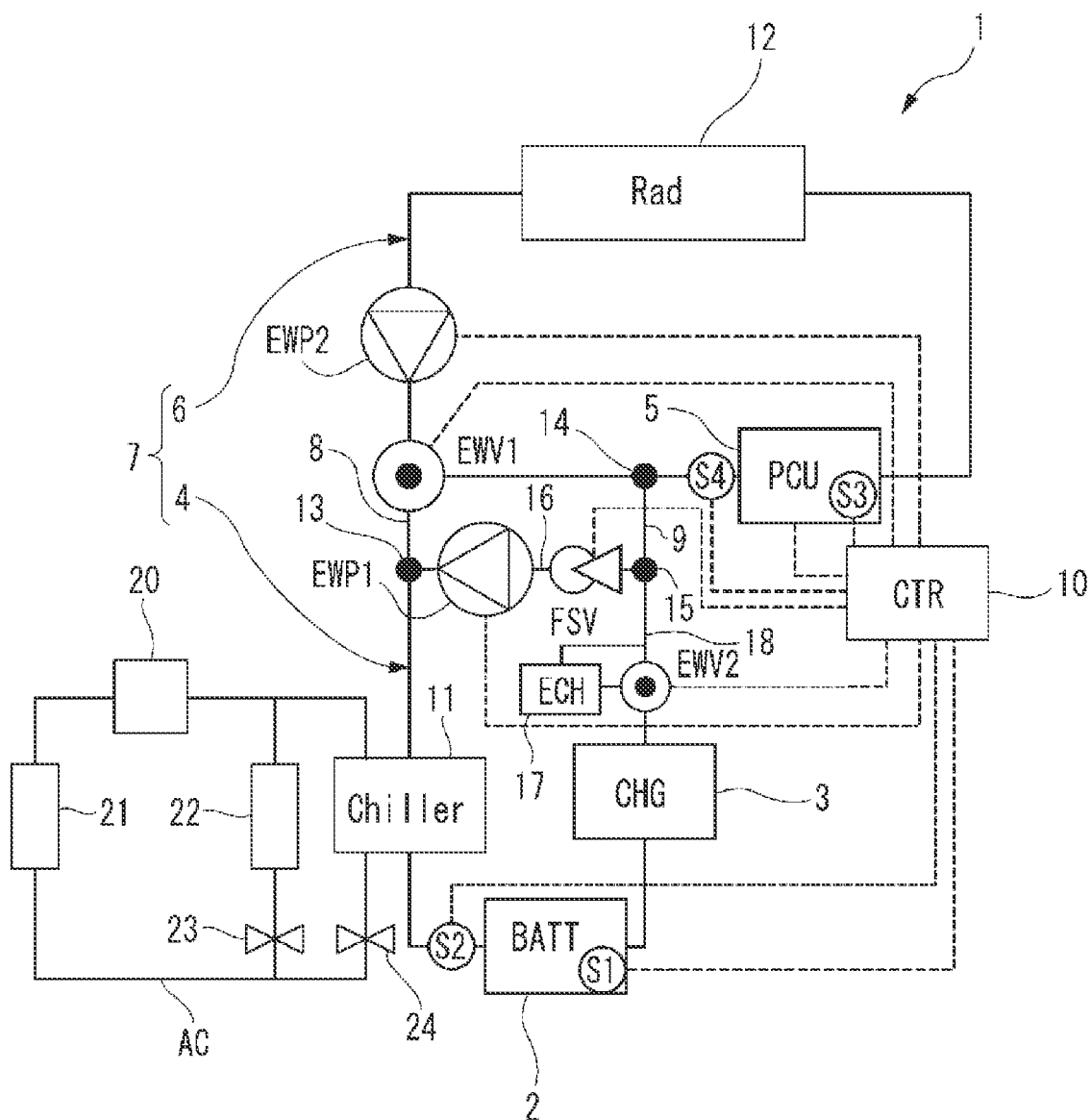
FIG. 1 is a circuit diagram illustrating a configuration of a temperature adjustment circuit included in a vehicle according to an embodiment of the present invention.

First, a temperature adjustment circuit 1 mounted on a vehicle according to an embodiment of the present invention will be described. As illustrated in FIG. 1, the temperature adjustment circuit 1 includes a first temperature adjustment circuit 4 including a first pump EWP1 which supplies a heat medium to a battery 2 and a charger 3, a chiller 11 which can exchange heat between the heat medium and a heat medium for air conditioning, and a heater 17 which can heat the heat medium, a second temperature adjustment circuit 6 including a second pump EWP2 which supplies a heat medium to a power conversion device 5, and a radiator 12 which performs heat exchange between the heat medium and an outside air, a first coupling passage 8 and a second coupling passage 9 which connect the first temperature adjustment circuit 4 and the second temperature adjustment circuit 6 to form a coupling circuit 7, a first electromagnetic switching valve EWV1 which can switch between a circulation state in which the heat medium can circulate through the coupling circuit 7 and a non-circulation state in which the heat medium cannot circulate through the coupling circuit 7, and a control device 10 which selects any one mode of a plurality of modes. The heat medium is a liquid medium such as water, a radiator liquid, or a coolant liquid.

[Plurality of Modes]

The plurality of modes include a series mode (see FIG. 5) in which, in the circulation state, the heat medium is circulated in the coupling circuit 7 in a state in which the chiller 11 is not capable of exchanging head between the heat medium and the heat medium for air conditioning, and a separate mode (see FIGS. 2 to 4) in which the heat medium is circulated at least in the second temperature adjustment circuit 6 in the non-circulation state. In addition, the separate mode includes a separate basic mode (see FIG. 2) in which the heat medium is circulated only in the second temperature adjustment circuit 6 in the non-circulation state, a separate cooling mode (see FIG. 3) in which, in the non-circulation state, the heat medium is circulated in the second temperature adjustment circuit 6 and the heat medium is circulated in the first temperature adjustment circuit 4 in a state in which the chiller 11 is capable of exchanging heat between the heat medium and the heat medium for air conditioning, and a separate heating mode (see FIG. 4) in which, in the non-circulation state, the heat medium is circulated in the second temperature adjustment circuit 6 and the heat medium is circulated in the first temperature adjustment circuit 4 in a state in which the heater 17 is capable of heating the heat medium.

[First Temperature Adjustment Circuit]

The first temperature adjustment circuit 4 includes the first pump EWP1 which circulates the heat medium in the circuit, the chiller 11 which is disposed downstream of the first pump EWP1 and is able to exchange the heat between the heat medium and the heat medium for air conditioning, the battery 2 and the charger 3 which are disposed downstream of the chiller 11, the heater 17 which is disposed downstream of the charger 3 and can heat the heat medium, a bypass path 18 which bypasses the heater 17, a second electromagnetic switching valve unit EWV2 which is disposed at an upstream end of the bypass path 18 and switches between a state in which the heat medium flows through the heater 17 and a state in which the heat medium flows through the bypass path 18, and an electromagnetic on-off valve FSV which is disposed downstream of the heater 17 and the second electromagnetic switching valve EWV2 and upstream of the first pump EWP1.

Figure 3:
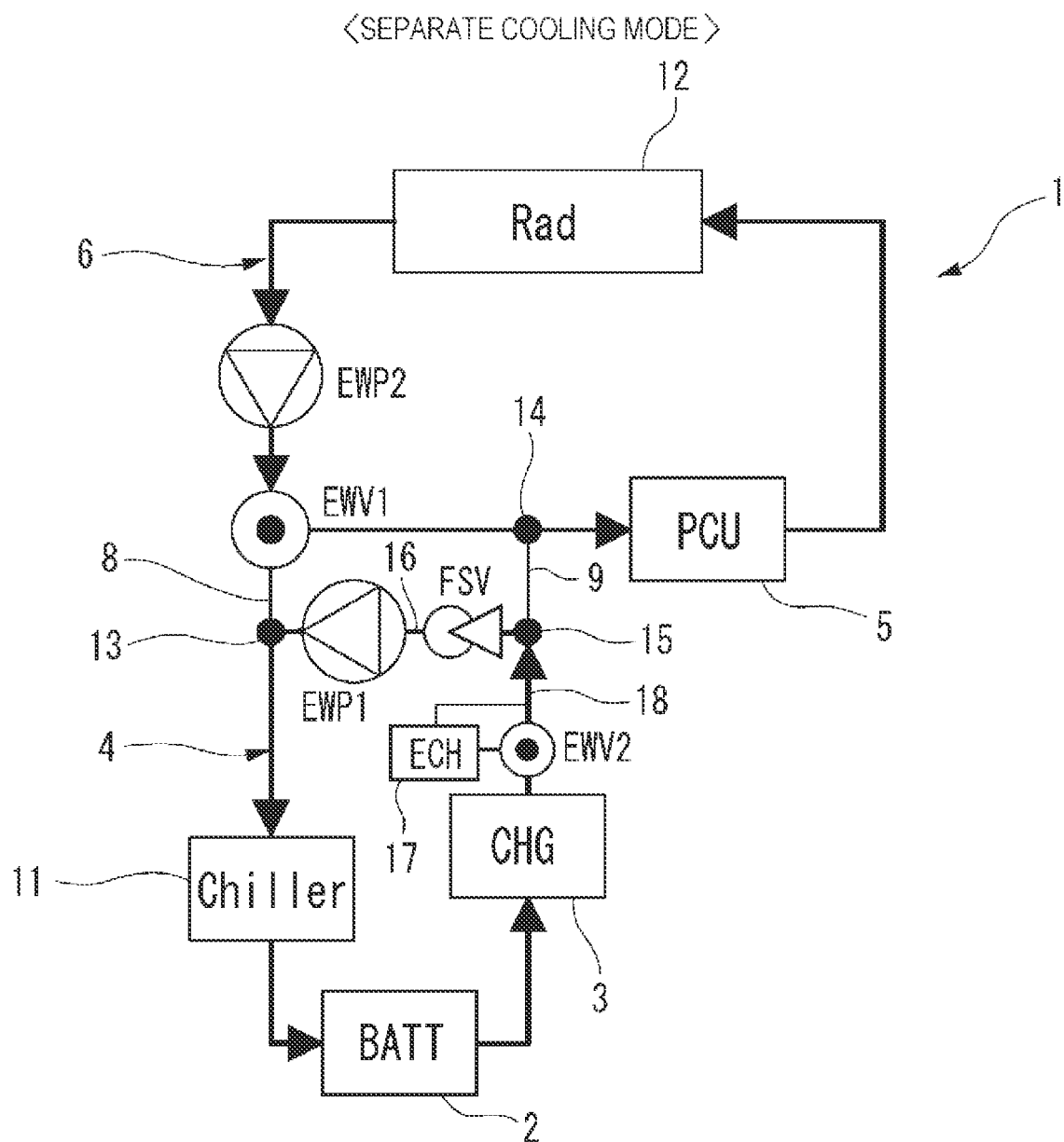
FIG. 3 is an explanatory diagram illustrating a flow of the heat medium in a separate cooling mode in the temperature adjustment circuit of FIG. 1.

As illustrated in FIG. 3, in the separate cooling mode, the first pump EWP1 is driven in a state in which the electromagnetic on-off valve FSV is opened and the second electromagnetic switching valve EWV2 is switched to a bypass path 18 side, so that the heat medium discharged from the first pump EWP1 can be circulated in an order of the chiller 11 (operating state), the battery 2, and the charger 3. As a result, the heat medium cooled by an operation of the chiller 11 exchanges heat with the battery 2 and the charger 3, and the battery 2 and the charger 3 are cooled.

Figure 4:
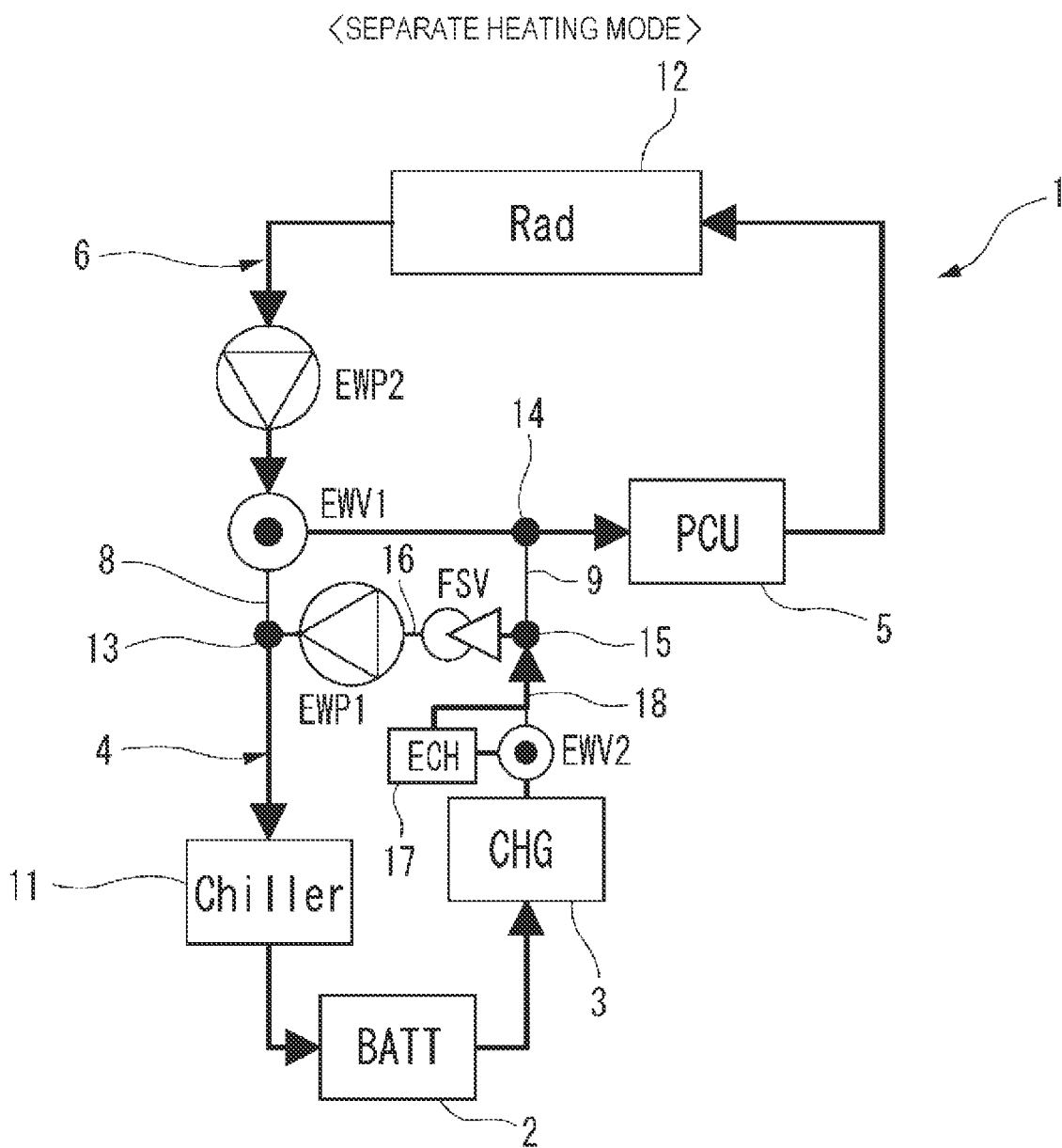
FIG. 4 is an explanatory diagram illustrating a flow of the heat medium in a separate heating mode in the temperature adjustment circuit of FIG. 1.

As illustrated in FIG. 4, in the separate heating mode, the first pump EWP1 is driven in a state in which the electromagnetic on-off valve FSV is opened and the second electromagnetic switching valve EWV2 is switched to a heater 17 side, so that the heat medium discharged from the first pump EWP1 can be circulated in an order of the chiller 11 (non-operating state), the battery 2, the charger 3, and the heater 17 (operating state). As a result, the heat medium heated by an operation of the heater 17 exchanges heat with the battery 2 and the charger 3, and the battery 2 and the charger 3 are heated.

Returning to FIG. 1, an air conditioner AC through which the heat medium for air conditioning flows includes a compressor 20, a condenser 21, an evaporator 22, and shut-off valves 23, 24, and the compressor 20, the condenser 21, and the evaporator 22 are connected in series, and the evaporator 22 and the chiller 11 are connected in parallel. In the air conditioner AC, a flow path to the evaporator 22 and a flow path to the chiller 11 are switchable by the shut-off valves 23, 24.

[Second Temperature Adjustment Circuit]

The second temperature adjustment circuit 6 includes the second pump EWP2 which circulates the heat medium in the circuit, the first electromagnetic switching valve EWV1 which is disposed downstream of the second pump EWP2 and switches the mode, the power conversion device 5 which is disposed downstream of the first electromagnetic switching valve EWV1, and the radiator 12 which is disposed downstream of the power conversion device 5 and performs heat exchange between the heat medium and the outside air. The power conversion device 5 includes at least one of an inverter which converts direct current electric power into alternating current electric power and also converts the alternating current electric power into the direct current electric power, and a DC-DC conversion device which boosts or steps down a direct current voltage.

Figure 2:
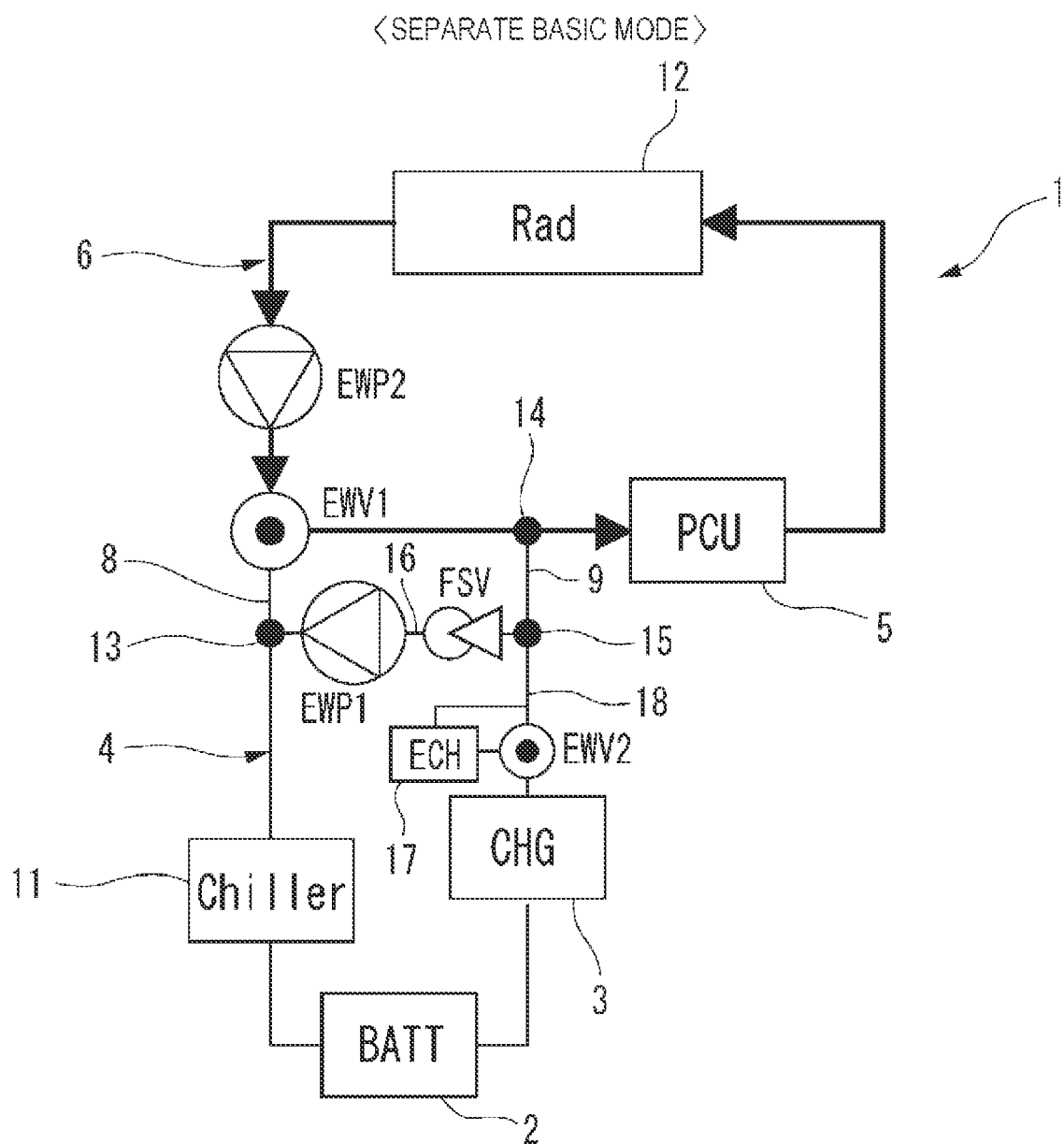
FIG. 2 is an explanatory diagram illustrating a flow of a heat medium in a separate basic mode in the temperature adjustment circuit of FIG. 1.

The first electromagnetic switching valve EWV1 of the present embodiment is an electromagnetic three-way valve, and in the separate mode (the separate basic mode, the separate cooling mode and the separate heating mode), connection between a downstream side flow path of the second pump EWP2 and an upstream side flow path of the power conversion device 5 is allowed, and connection between the downstream side flow path of the second pump EWP2 and the first coupling passage 8 to be described later is cut off. In the separate mode, as illustrated in FIGS. 2 and 4, by driving the second pump EWP2, the heat medium discharged from the second pump EWP2 can be circulated in an order of the power conversion device 5 and the radiator 12. As a result, the heat medium cooled by the radiator 12 exchanges heat with the power conversion device 5, and the power conversion device 5 is cooled.

Figure 5:
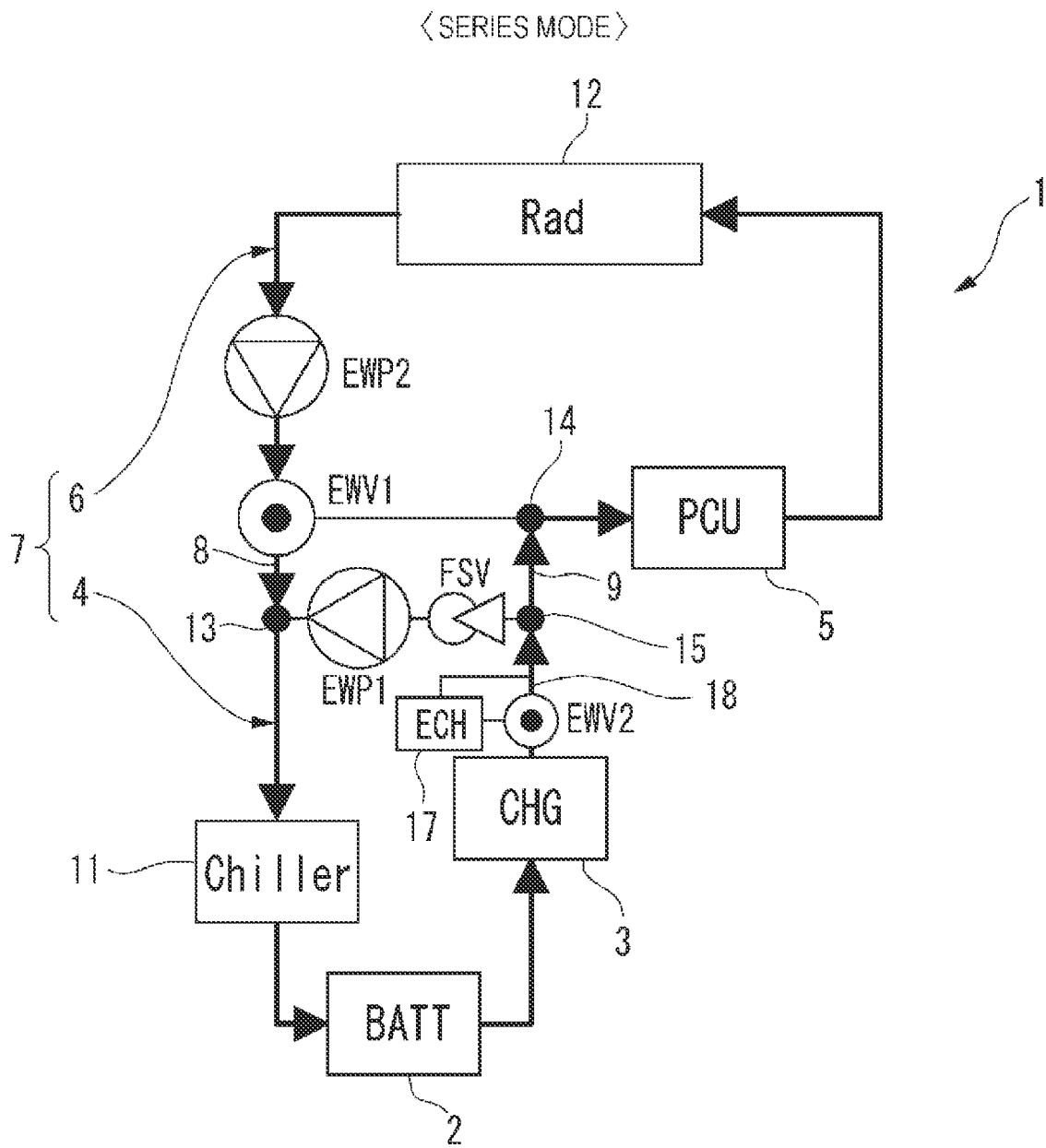
FIG. 5 is an explanatory diagram illustrating a flow of the heat medium in a series mode in the temperature adjustment circuit of FIG. 1.

In the series mode, as illustrated in FIG. 5, the first electromagnetic switching valve EWV1 cuts off the connection between the downstream side flow path of the second pump EWP2 and the upstream side flow path of the power conversion device 5, and allows the connection between the downstream side flow path of the second pump EWP2 and the first coupling passage 8 to be described later. A flow of a heat refrigerant in the series mode will be described later.

[Coupling Circuit]

The coupling passages 8, 9 include the first coupling passage 8 and the second coupling passage 9. The first coupling passage 8 connects a first connection portion (first electromagnetic switching valve EWV1) of the second temperature adjustment circuit 6 and a first connection portion 13 of the first temperature adjustment circuit 4, and the second coupling passage 9 connects a second connection portion 14 of the second temperature adjustment circuit 6 and a second connection portion 15 of the first temperature adjustment circuit 4. The second connection portion 14 of the second temperature adjustment circuit 6 is positioned downstream of the first electromagnetic switching valve EWV1 in the second temperature adjustment circuit 6 and upstream of the power conversion device 5, the first connection portion 13 of the first temperature adjustment circuit 4 is positioned downstream of the first pump EWP1 in the first temperature adjustment circuit 4 and upstream of the chiller 11, and the second connection portion 15 of the first temperature adjustment circuit 4 is positioned downstream of the heater 17 and the second electromagnetic switching valve EWV2 in the first temperature adjustment circuit 4 and upstream of the electromagnetic on-off valve FSV.

A passage between the first connection portion 13 and the second connection portion 15 in the first temperature adjustment circuit 4, that is, a passage in which the first pump EWP1 and the electromagnetic on-off valve FSV are disposed in the first temperature adjustment circuit 4 functions as a branch passage 16 which bypasses a part thereof in the coupling circuit 7.

As illustrated in FIG. 5, in the series mode in which the heat medium circulates through the coupling circuit 7, operations of the first pump EWP1, the chiller 11 and the heater 17 are stopped, and the heat medium is circulated by driving the second pump EWP2. As a result, the heat medium discharged from the second pump EWP2 circulates in the order of the battery 2, the charger 3, the power conversion device 5, and the radiator 12, and the battery 2, the charger 3, and the power conversion device 5 are cooled. In addition, in the series mode, the electromagnetic on-off valve FSV is closed to stop the circulation of the heat medium via the branch passage 16.

[Control Device]

As illustrated in FIG. 1, the control device 10 receives temperature information from a first temperature sensor S1 which acquires a first temperature Tbat, which is the temperature of the battery 2, a second temperature sensor S2 which acquires a second temperature Tw bat, which is a temperature of the heat medium at an inlet of the battery 2, a third temperature sensor S3 which acquires a third temperature Tpcu, which is a temperature of the power conversion device 5 (for example, a temperature of a semiconductor chip), and a fourth temperature sensor S4 which acquires a fourth temperature Tw pcu, which is a temperature of the heat medium at an inlet of the power conversion device 5, and selects any one mode of the modes in accordance with the first temperature Tbat, the second temperature Tw bat, the third temperature Tpcu, and the fourth temperature Tw pcu.

[Control Map]

Figure 6:
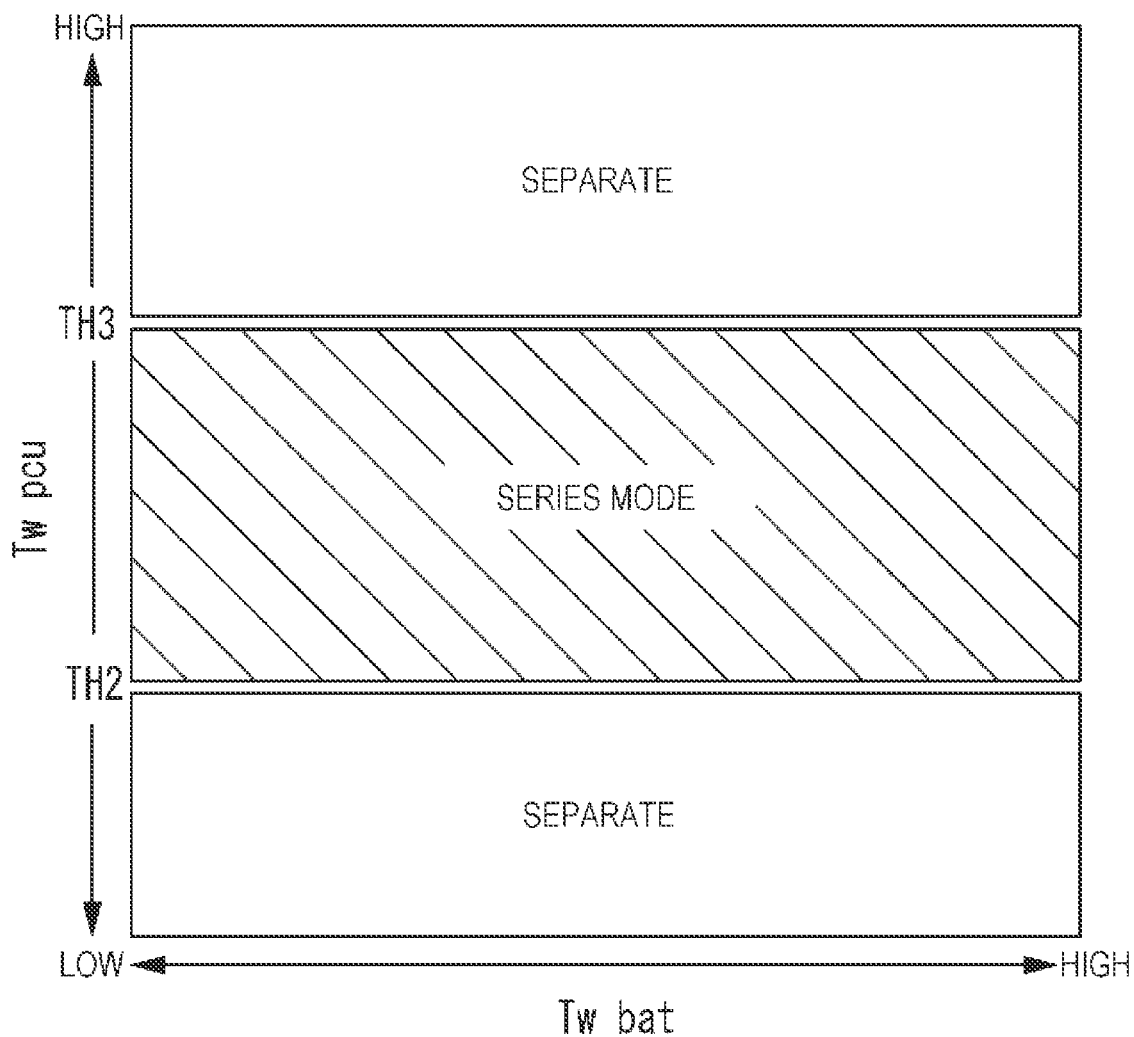
FIG. 6 is an explanatory diagram illustrating a basic control map (MapI).
Figure 7:
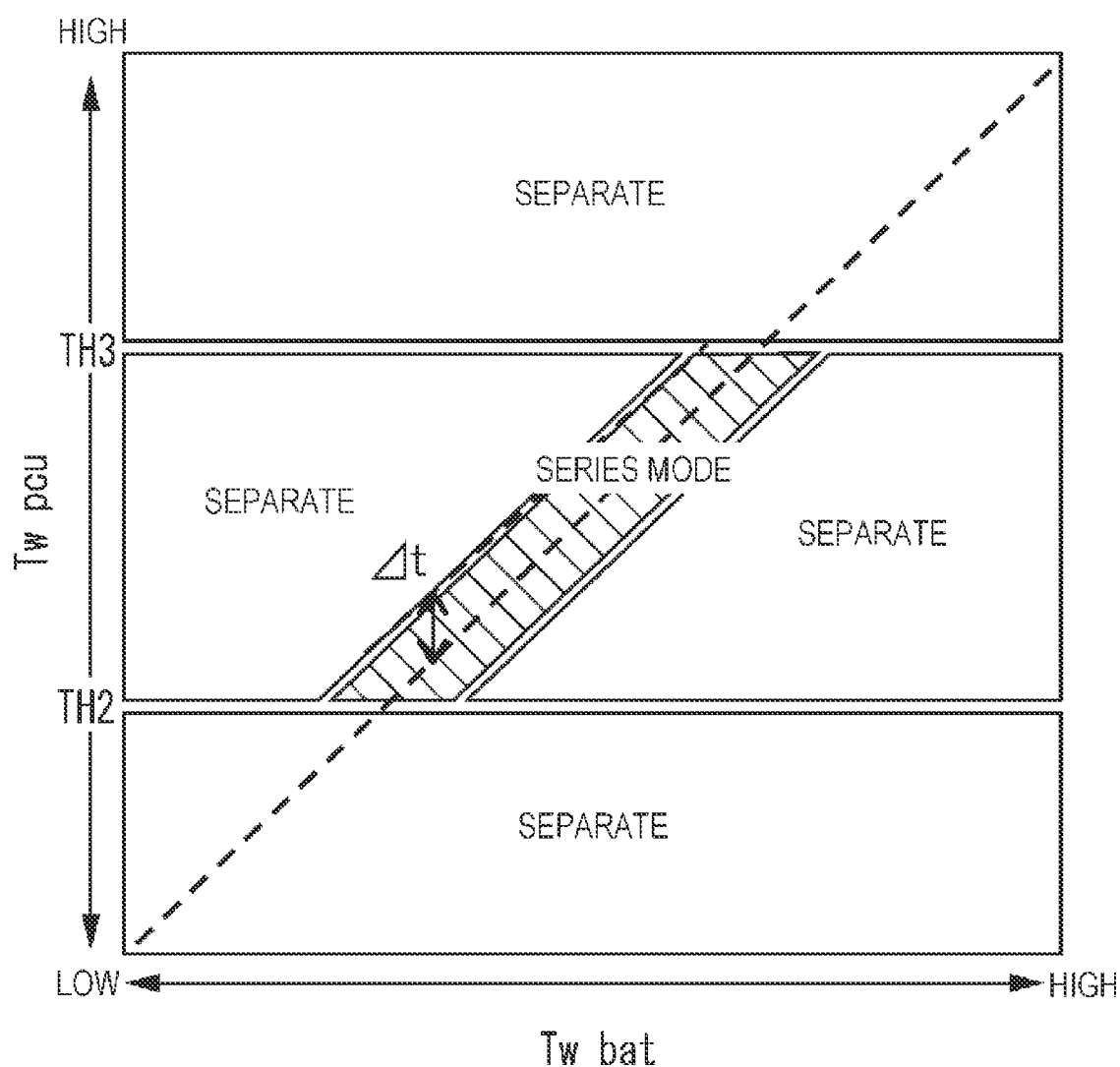
FIG. 7 is an explanatory diagram illustrating a special control map (MapII).

When selecting the mode, the control device 10 uses a basic control map MapI and a special control map MapII. As illustrated in FIGS. 6 and 7, the basic control map MapI and the special control map MapII define mode switching conditions between the separate mode and the series mode. In the basic control map MapI, since the mode is permitted to be switched in accordance with the fourth temperature Tw pcu regardless of the second temperature Tw bat, a condition area in which the series mode is selected is wide. On the other hand, in the special control map MapII, since the mode is permitted to be switched in accordance with the second temperature Tw bat and the fourth temperature Tw pcu, a condition area in which the series mode is selected is narrower than the basic control map MapI.

As will be described in detail later, after selecting the series mode based on the special control map MapII, the control device 10 performs a control based on the basic control map MapI. As a result, frequent occurrence of switching from the series mode to the separate mode can be suppressed, so that a decrease in a product life due to a load such as the first electromagnetic switching valve EWV1 can be suppressed, and generation of an operating noise such as the first electromagnetic switching valve EWV1 can be suppressed.

(Mode Switching Process)

Next, mode switching process procedures using the basic control map MapI and the special control map MapII will be described with reference to FIGS. 8 to 10.

Figure 8:
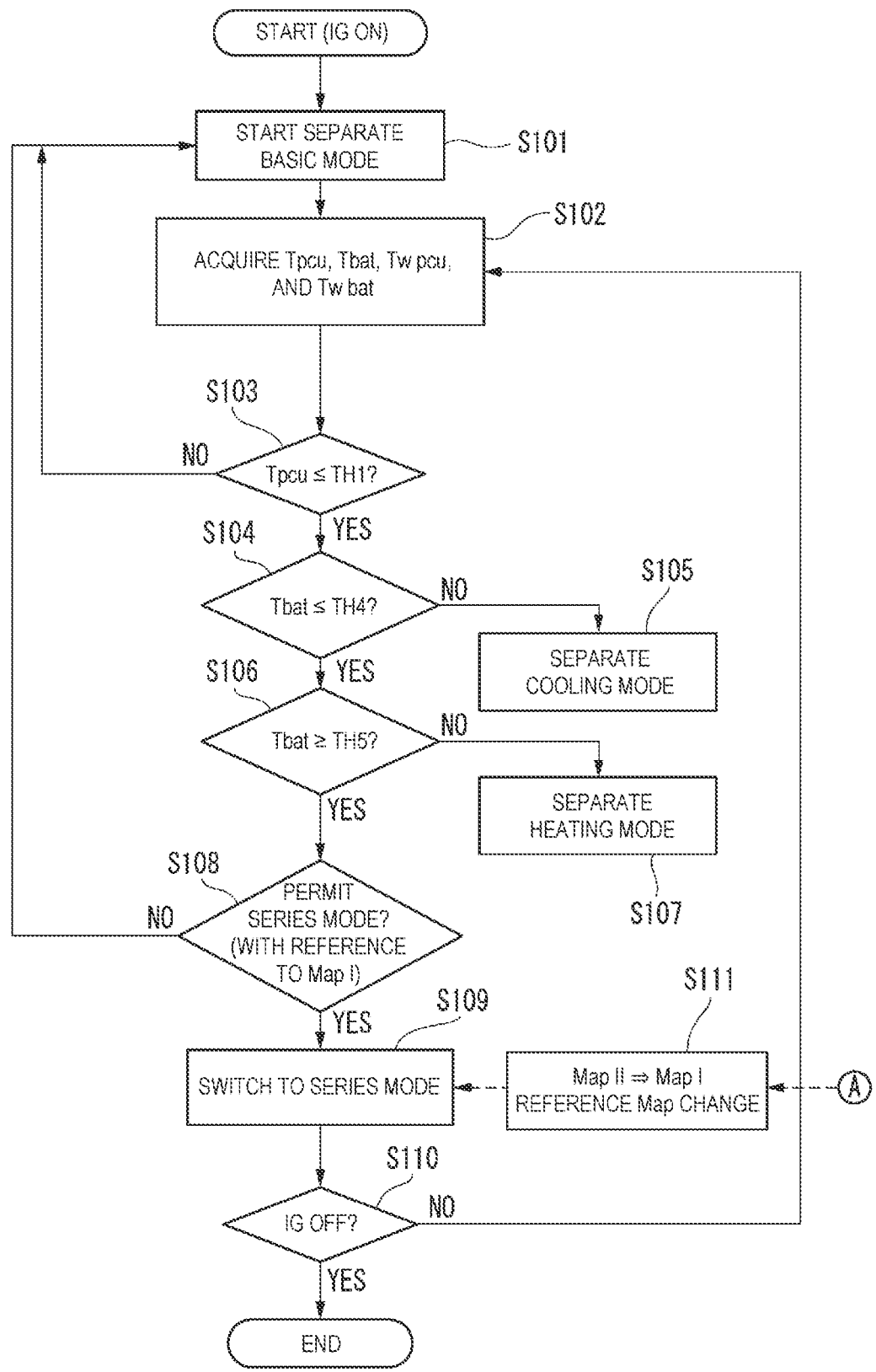
FIG. 8 is a flowchart illustrating a mode switching process procedure of the temperature adjustment circuit of FIG. 1.

As illustrated in FIG. 8, when the vehicle V is started (ignition on), the control device 10 selects the separate basic mode (S101). By selecting the separate basic mode when the vehicle V is started, it is possible to rapidly cope with cooling accompanied by a sudden load at the time of starting the vehicle. In addition, a load of the second pump EWP2 at the time of starting the vehicle can be reduced. Next, the control device 10 acquires the first temperature Tbat, the second temperature Tw bat, the third temperature Tpcu, and the fourth temperature Tw pcu (S102), then determines whether the third temperature Tpcu is equal to or lower than a first threshold value TH1 (S103), and prohibits the series mode and continues the separate basic mode regardless of the basic control map MapI, in a case where a determination result is NO. That is, the series mode is prohibited when the third temperature Tpcu is high, so that a required flow rate required for cooling the power conversion device 5 can be ensured.

Subsequently, in a case where the determination result in step S103 is YES, the control device 10 determines whether the first temperature Tbat is equal to or lower than a fourth threshold value TH4 (S104), and in a case where a determination result is NO, the control device 10 selects the separate cooling mode (S105). The fourth threshold value TH4 is a threshold value for starting the cooling of the battery 2 in order to suppress deterioration of cells of the battery 2. That is, when the first temperature Tbat is high, since the battery 2 cannot be sufficiently cooled in the separate basic mode or the series mode, the separate cooling mode is selected. A process procedure of the separate cooling mode will be described later.

In a case where the determination result in step S104 is YES, the control device 10 determines whether the first temperature Tbat is equal to or higher than a fifth threshold value TH5 (S106), and in a case where the determination result is NO, the control device 10 selects the separate heating mode (S107). The fifth threshold value TH5 is a threshold value on a low temperature side at which the battery 2 cannot satisfy an output request from the vehicle. That is, when the first temperature Tbat is low, the separate heating mode is selected and the battery 2 is preferentially heated. A process procedure of the separate heating mode will be described later. That is, in step S104 and step S106, the control device 10 selects one of the plurality of modes based on the first temperature Tbat.

In a case where the determination result in step S106 is YES, the control device 10 determines whether the series mode is permitted with reference to the basic control map MapI (S108). Specifically, when the fourth temperature Tw pcu is equal to or higher than a second threshold value TH2 and equal to or lower than a third threshold value TH3, the control device 10 permits the series mode and switches the mode from the separate basic mode to the series mode (S109). That is, the basic control map MapI is, in a case where the fourth temperature Tw pcu is a normal water temperature, a condition area in which the series mode is selected, the battery 2 and the power conversion device 5 can be appropriately cooled while suppressing power consumption due to the operation of the chiller 11.

In step S108, when the fourth temperature Tw pcu is higher than the third threshold value TH3, the control device 10 does not permit the series mode and continues the separate basic mode. As a result, it is possible to prevent the high-temperature heat medium from flowing to the battery 2, and to suppress the deterioration of the battery 2. Further, in step S108, when the fourth temperature Tw pcu is lower than the second threshold value TH2, the control device 10 does not permit the series mode and continues the separate basic mode. As a result, a heat medium having a high viscosity can be prevented from circulating through the coupling circuit 7, and accordingly a pressure loss can be reduced.

In step S109, after switching to the series mode, the control device 10 determines shutdown (ignition off) of a vehicle V (S110), and in a case where a determination result is NO, the control device 10 returns to step S102 and repeats the above processing.

(Separate Cooling Mode)

Figure 9:
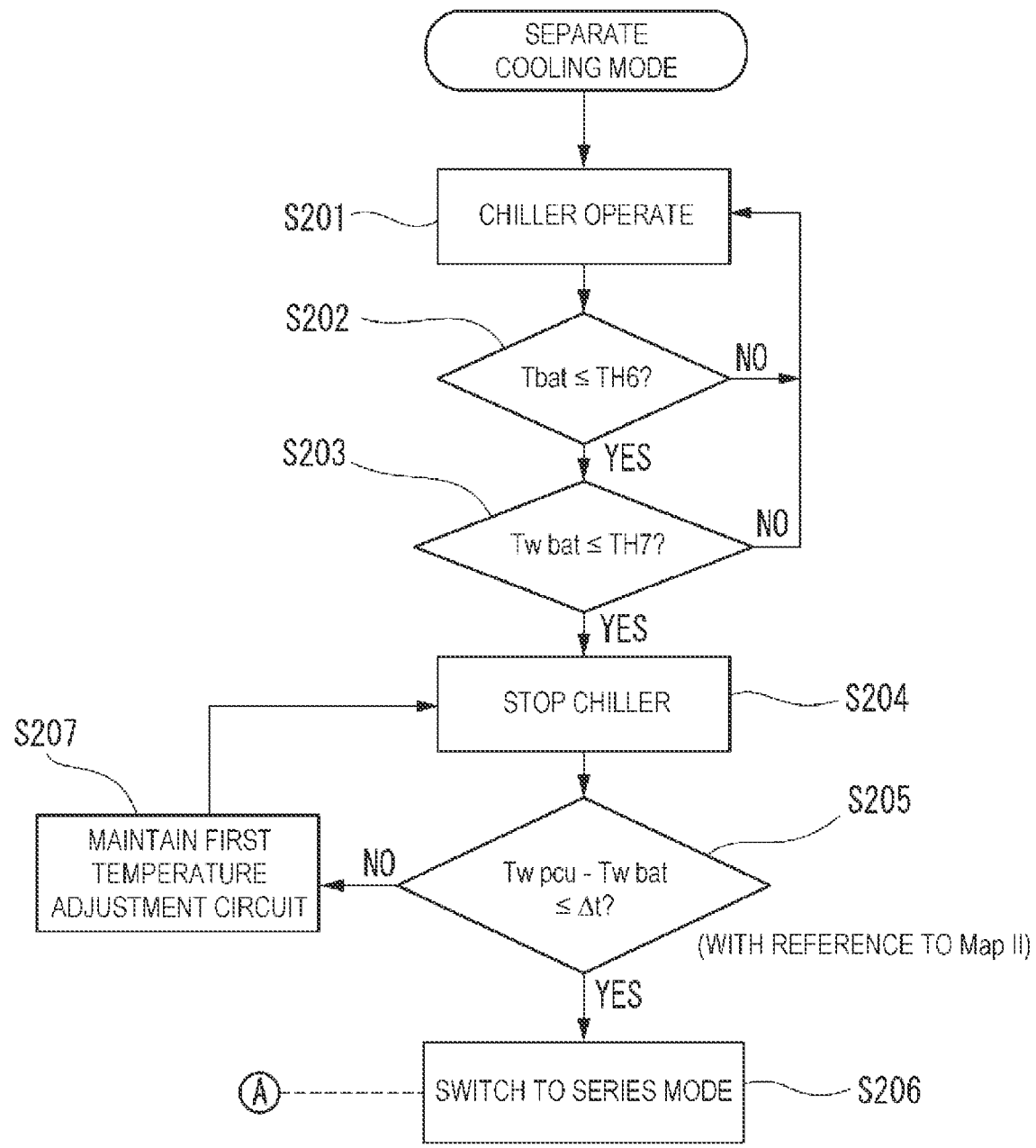
FIG. 9 is a flowchart illustrating a process procedure in the separate cooling mode of the temperature adjustment circuit of FIG. 1.

As illustrated in FIG. 9, in the separate cooling mode, the control device 10 operates the chiller 11 to circulate the heat medium in the first temperature adjustment circuit 4 (S201), determines whether the first temperature Tbat is equal to or lower than a sixth threshold value TH6 (S202), and determines whether the second temperature Tw bat is equal to or lower than a seventh threshold value TH7 (S203). The control device 10 continues the circulation of the heat medium in which the chiller 11 is operated until both determination results of the steps S202 and S203 are YES, while when the determination results of the steps S202 and S203 are both YES, the control device 10 stops the operation of the chiller 11 (S204), and then determines switching to the series mode with reference to the special control map MapII (S205).

Specifically, when a difference between the fourth temperature Tw pcu and the second temperature Tw bat is equal to or less than a predetermined value Δt, the control device 10 selects the series mode (S206), switches the control map from the special control map MapII to the basic control map MapI (S111 of FIG. 8), and proceeds to step S109 of FIG. 8. On the other hand, in a case of NO in S205, the circulation state of the heat medium in the first temperature adjustment circuit 4 is maintained in a state in which the chiller 11 is stopped (S207). That is, when the series mode is selected when the difference between the fourth temperature Tw pcu and the second temperature Tw bat is large, there is a possibility that the cooled heat medium of the first temperature adjustment circuit 4 is heated under an influence of the heat medium of the second temperature adjustment circuit 6, and therefore, the selection of the series mode is prohibited until the difference between the fourth temperature Tw pcu and the second temperature Tw bat becomes equal to or lower than the predetermined value. In addition, the selection of the series mode is permitted after the difference between the fourth temperature Tw pcu and the second temperature Tw bat becomes equal to or lower than the predetermined value, and the control map is switched from the special control map MapII to the basic control map MapI, so that it is possible to suppress occurrence of early switching from the series mode to the separate mode.

(Separate Heating Mode)

Figure 10:
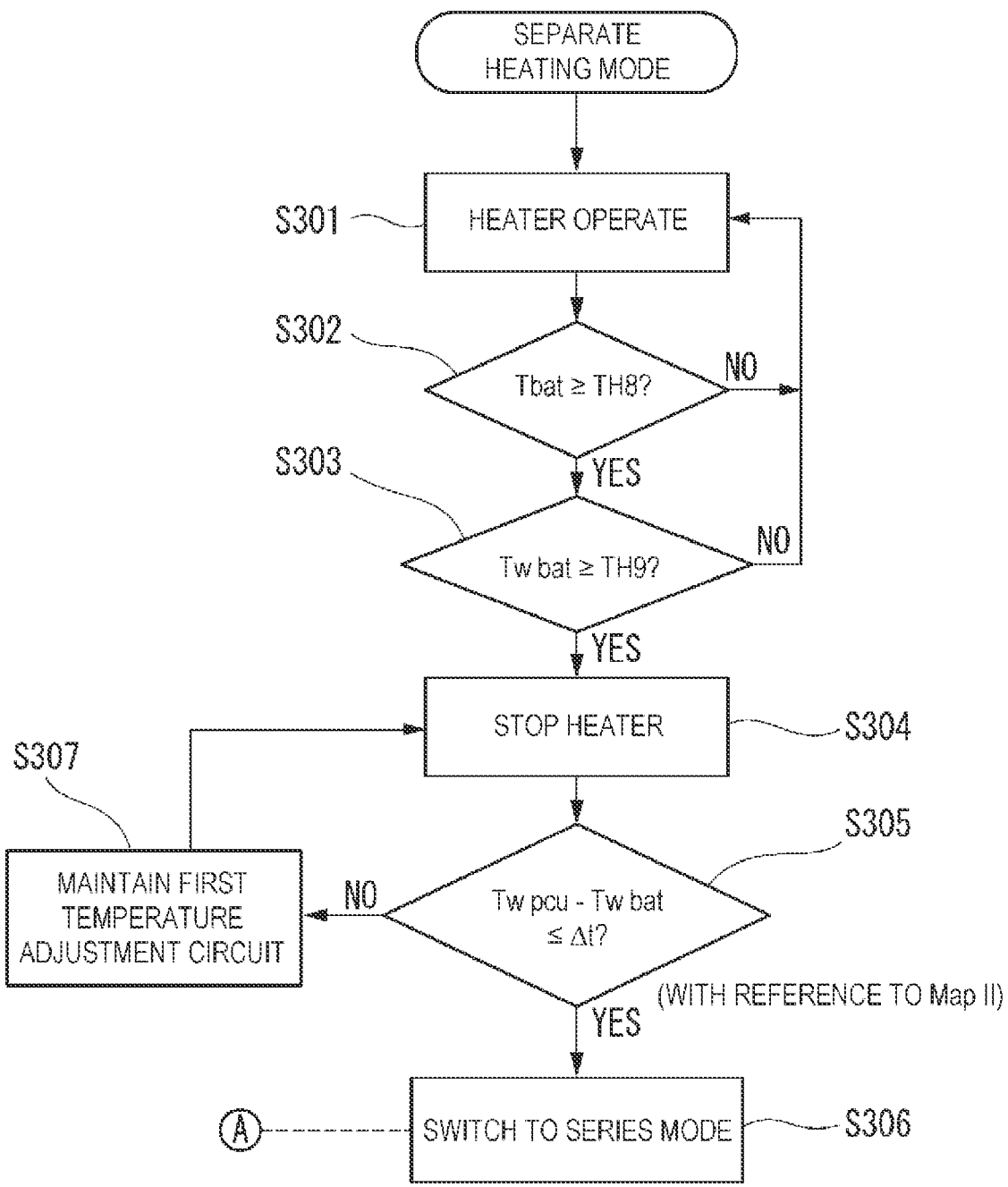
FIG. 10 is a flowchart illustrating a process procedure in the separate heating mode of the temperature adjustment circuit of FIG. 1.

As illustrated in FIG. 10, in the separate heating mode, the control device 10 operates the heater 17 to circulate the heat medium in the first temperature adjustment circuit 4 (S301), determines whether the first temperature That is equal to or higher than an eighth threshold value TH8 (S302), and determines whether the second temperature Tw bat is equal to or higher than a ninth threshold value TH9 (S303). The control device 10 continues the circulation of the heat medium in which the heater 17 is operated until both determination results of the steps S302 and S303 are YES, while when the determination results of the steps S302 and S303 are both YES, after an operation of the heater 17 is stopped (S304), the control device 10 determines the switching to the series mode with reference to the special control map MapII (S305).

Specifically, when the difference between the fourth temperature Tw pcu and the second temperature Tw bat is equal to or less than the predetermined value Δt, the control device 10 selects the series mode (S306), switches the control map from the special control map MapII to the basic control map MapI (S111 of FIG. 8), and proceeds to step S109 of FIG. 8. On the other hand, in a case of NO in S305, the circulation state of the heat medium in the first temperature adjustment circuit 4 is maintained in a state in which the heater 17 is stopped (S307). That is, when the series mode is selected when the difference between the fourth temperature Tw pcu and the second temperature Tw bat is large, there is a possibility that the heated heat medium of the first temperature adjustment circuit 4 is affected by the heat medium of the second temperature adjustment circuit 6, and therefore, the selection of the series mode is prohibited until the difference between the fourth temperature Tw pcu and the second temperature Tw bat becomes equal to or lower than the predetermined value. In addition, the selection of the series mode is permitted after the difference between the fourth temperature Tw pcu and the second temperature Tw bat becomes equal to or lower than the predetermined value, and the control map is switched from the special control map MapII to the basic control map MapI, so that it is possible to suppress the occurrence of early switching from the series mode to the separate mode.

In the above embodiment, the first threshold value TH1 is an allowable upper limit temperature of a semiconductor chip of the power conversion device 5. The second threshold value TH2 and the third threshold value TH3 are the second threshold value TH2<the third threshold value TH3. The fourth threshold value TH4 and the fifth threshold value TH5 are the fourth threshold value TH4>the fifth threshold value TH5. The sixth threshold value TH6 and the seventh threshold value TH7 may be the same or different. The eighth threshold value TH8 and the ninth threshold value TH9 may be the same or different, but the sixth threshold value TH6 and the seventh threshold value TH7>the eighth threshold value TH8 and the ninth threshold value TH9. In addition, since the allowable upper limit temperature of the semiconductor chip of the power conversion device 5 is higher than a management upper limit temperature of the battery 2, the first threshold value TH1>the fourth threshold value TH4 is satisfied.

Figure 11:
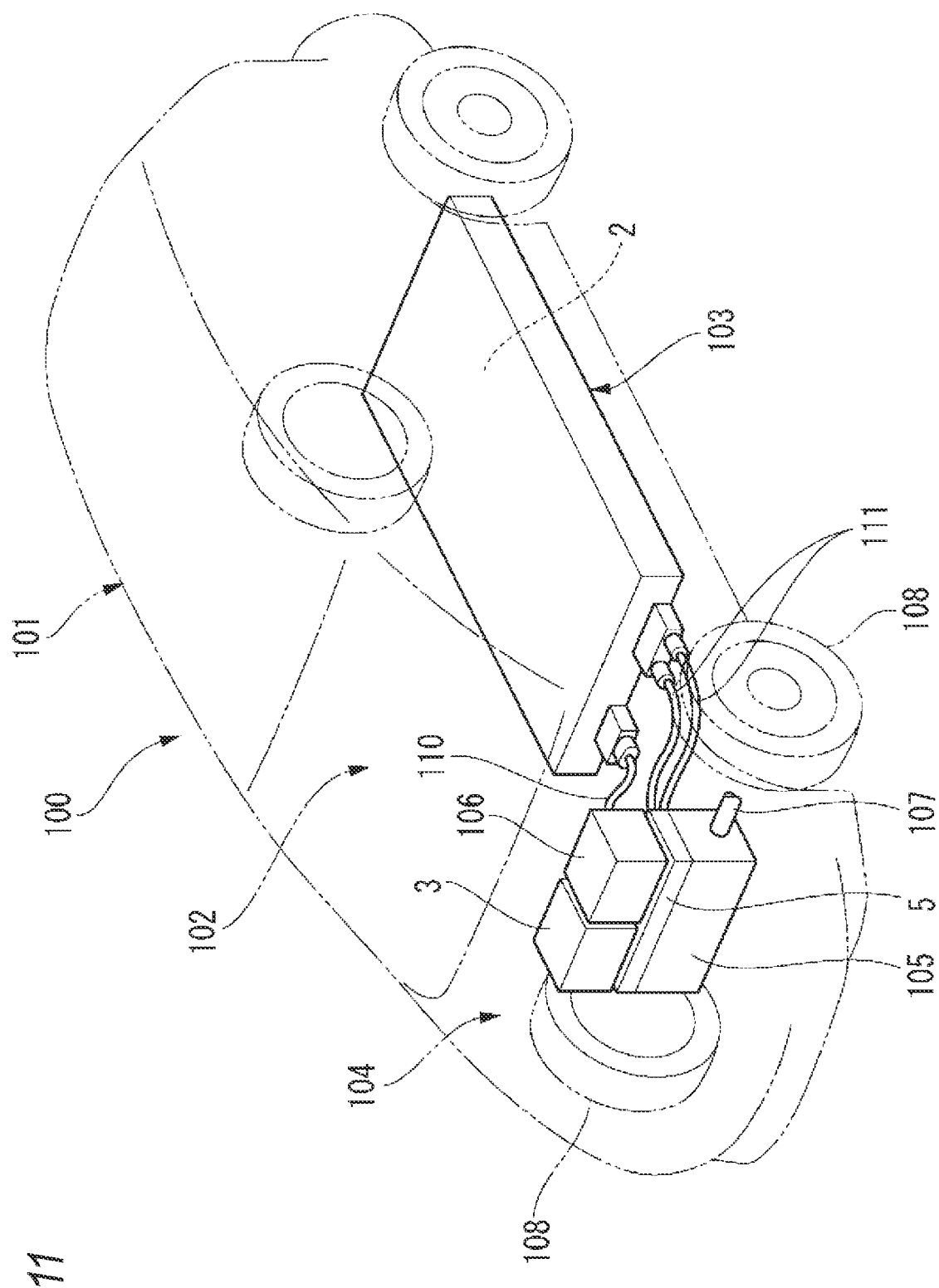
FIG. 11 is a perspective view illustrating a schematic configuration of the vehicle according to the embodiment of the present invention.

FIG. 11 is a perspective view illustrating a schematic configuration of a vehicle 100 which is a vehicle according to the embodiment of the present invention. The vehicle 100 may be an electric vehicle having only an electric motor as a drive source, a fuel cell vehicle, or a hybrid automobile having an electric motor and an internal combustion engine. In the following description, an electric vehicle will be described as an example. In FIG. 10, the temperature adjustment circuit 1 and the air conditioner AC are omitted.

A vehicle body 101 of the vehicle 100 is provided with a battery case 103 which accommodates the battery 2 at an underfloor portion of a vehicle interior 102. A motor room 104 is provided in a front portion of the vehicle 100. A motor 105, the power conversion device 5, a branch unit 106, the charger 3, and the like are provided in the motor room 104.

A rotational driving force of the motor 105 is transmitted to a shaft 107. Front wheels 108 of the vehicle 100 are connected to both end portions of the shaft 107. The power conversion device 5 is disposed above the motor 105 and is fastened and fixed directly to a case of the motor 105. The power conversion device 5 is electrically connected to a connector of the battery case 103 via power source cables 111. In addition, the power conversion device 5 is electrically connected to the motor 105 by, for example, a three-phase bus bar. The power conversion device 5 controls driving of the motor 105 by electric power supplied from the battery 2.

The branch unit 106 and the charger 3 are disposed side by side in parallel in left and right sides. The branch unit 106 and the charger 3 are disposed above the power conversion device 5. The branch unit 106 and the charger 3 are disposed in a state of being separated from the power conversion device 5. The branch unit 106 and the battery case 103 are electrically connected to each other by a cable 110 having connectors at both ends.

The branch unit 106 is electrically connected to the charger 3. The charger 3 is connected to a general external power source such as a household power source to charge the battery 2. The charger 3 and the branch unit 106 are electrically connected to each other by a cable (not illustrated) having connectors at both ends.

Although the embodiment of the present invention has been described above, the present invention is not limited to the above embodiment, and can be appropriately modified, improved, or the like. For example, in the above embodiment, the mode selection process during traveling has been described, but the control device 10 can perform appropriate mode selection even during charging of the battery 2. For example, during the charging of the battery 2, if the heat medium is circulated in the first temperature adjustment circuit 4 in a state in which the chiller 11 is capable of exchanging heat between the heat medium and the heat medium for air conditioning in the series mode or the separate mode, the battery 2, the charger 3, and the power conversion device 5 can be appropriately cooled in the separate mode or the series mode while suppressing the power consumption associated with the operation of the chiller 11 during the charging of the battery 2 and suppressing a long charging time.

In the above embodiment, the heater 17 is illustrated as an example of a heating device, but the present invention is not limited thereto, and the heating device may be a heat exchanger which uses other heat source of the vehicle, exhaust heat of an engine, or the like.

In the present specification, at least the following matters are described. Although corresponding constituent elements or the like in the above embodiment are illustrated in parentheses, the present invention is not limited thereto.

(1) A vehicle including:
 a battery (battery 2);
 an air conditioner (air conditioner AC);
 a first temperature adjustment circuit (first temperature adjustment circuit 4) including a first pump (first pump EWP1) configured to supply a heat medium to the battery and a first heat exchange unit (chiller 11) configured to exchange heat between the heat medium and a heat medium for air conditioning;
 a second temperature adjustment circuit (second temperature adjustment circuit 6) including a second pump (second pump EWP2) configured to supply the heat medium to a power conversion device (power conversion device 5) and a second heat exchange unit (radiator 12) configured to exchange heat between the heat medium and an outside air;

a coupling passage (first coupling passage 8, second coupling passage 9) configured to connect the first temperature adjustment circuit and the second temperature adjustment circuit to form a coupling circuit (coupling circuit 7);

a switching unit (first electromagnetic switching valve EWV1) configured to switch between a circulation state in which the heat medium is capable of circulating through the coupling circuit and a non-circulation state in which the heat medium is not capable of circulating through the coupling circuit;

a first temperature acquisition unit (first temperature sensor S1) configured to acquire a first temperature (first temperature Tbat) which is a temperature of the battery; and a control device (control device 10) configured to select any one mode of a plurality of modes based on at least the first temperature, in which the plurality of modes include:
  a series mode in which, in the circulation state, the heat medium is circulated in the coupling circuit in a state in which the first heat exchange unit is not capable of exchanging heat between the heat medium and the heat medium for air conditioning; and
  a separate mode in which the heat medium is circulated at least in the second temperature adjustment circuit in the non-circulation state, in which the control device includes a plurality of control maps, in which the plurality of control maps include:
  a basic control map (basic control map MapI) including the series mode and the separate mode, and
  a special control map (special control map MapII) including the series mode and the separate mode, the special control map having an area of the series mode narrower than the basic control map, and in which the control device is configured to,
  when the first temperature is within a predetermined temperature range (fifth threshold value TH5≤Tbat≤fourth threshold value TH4), perform a control based on the basic control map, and
  when the first temperature is out of the predetermined temperature range (Tbat<fifth threshold value TH5, and fourth threshold value TH4<Tbat), perform a control based on the special control map, and after the series mode of the special control map is selected, perform a control based on the basic control map.

According to (1), since the control device selects any one mode of the plurality of modes based on at least the first temperature which is the temperature of the battery, the temperatures of the battery and the power conversion device can be appropriately adjusted regardless of an outside air temperature.

In addition, when the first temperature is within the predetermined temperature range (for example, appropriate temperature), an amount of power consumption can be suppressed by controlling based on the basic control map, which has a wide area of the series mode.

Further, a control is performed based on the basic control map after selecting the series mode of the special control map in which the area of the series mode is narrow, so that frequent occurrence of switching from the series mode to the separate mode can be suppressed. Accordingly, a decrease in a product life due to a load of the switching unit can be suppressed, and generation of an operating noise of the switching unit can be suppressed.

(2) The vehicle according to (1), further including:
a second temperature acquisition unit (second temperature sensor S2) configured to acquire a second temperature (second temperature Tw bat) which is a temperature of the heat medium at an inlet of the battery;
a third temperature acquisition unit (third temperature sensor) configured to acquire a third temperature (third temperature Tpcu) which is a temperature of the power conversion device; and
a fourth temperature acquisition unit (fourth temperature sensor S4) configured to acquire a fourth temperature (fourth temperature Tw pcu) which is a temperature of the heat medium at an inlet of the power conversion device,
in which the control device selects any one mode of the plurality of modes in accordance with the first temperature, the second temperature, the third temperature, and the fourth temperature.

According to (2), the mode is selected in accordance with the second temperature which is an inlet water temperature of the battery, the third temperature which is the temperature of the power conversion device, and the fourth temperature which is an inlet water temperature of the power conversion device, in addition to the first temperature which is the temperature of the battery, so that the battery and the power conversion device can be appropriately cooled.

(3) The vehicle according to (2),
in which the control device is configured to, when the third temperature is higher than a first threshold value (first threshold value TH1), prohibit the series mode regardless of the plurality of control maps.

According to (3), when the third temperature is higher than the first threshold value, the series mode is prohibited, so that a required flow rate required for cooling the power conversion device can be ensured.

(4) The vehicle according to (2) or (3),
in which in the basic control map, an area, where the fourth temperature is equal to or higher than a second threshold value (second threshold value TH2) and equal to or lower than a third threshold value (third threshold value TH3), is corresponding to a condition area, where the series mode is selected regardless of the first temperature.

According to (4), in the basic control map, an area, where the fourth temperature is equal to or higher than a second threshold value and equal to or lower than a third threshold value (for example, a normal water temperature), is corresponding to a condition area, where the series mode is selected, so that the battery and the power conversion device can be appropriately cooled while suppressing power consumption.

(5) The vehicle according to (4),
in which when the first temperature is higher than a fourth threshold value (fourth threshold value TH4), the control device is configured to perform a control using the special control map, and
in which in the separate mode of the special control map, the control device is configured to cause the heat medium to be circulated in the second temperature adjustment circuit, and cause the heat medium to be circulated in the first temperature adjustment circuit in a state in which the first heat exchange unit is capable of exchanging heat between the heat medium and the heat medium for air conditioning (separate cooling mode).

According to (5), when the first temperature is higher than the fourth threshold value (for example, high temperature), since the battery cannot be sufficiently cooled by the heat exchange in the second heat exchange unit, in the separate mode, the heat medium is circulated in the first temperature adjustment circuit in a state in which the first heat exchange unit is capable of exchanging heat between the heat medium and the heat medium for air conditioning, so that the battery can be appropriately cooled by the first heat exchange unit.

(6) The vehicle according to (4) or (5),
in which the first temperature adjustment circuit includes a heating device (heater 17) configured to heat the heat medium,
in which when the first temperature is lower than a fifth threshold value (fifth threshold value TH5), the control device is configured to perform a control using the special control map, and
in which in the separate mode, the control device is configured to cause the heat medium to be circulated in the second temperature adjustment circuit, and cause the heat medium to be circulated in the first temperature adjustment circuit in a state in which the heating device is capable of heating the heat medium (separate heating mode).

According to (6), when the first temperature is lower than the fifth threshold value (for example, low temperature), in the separate mode, the heat medium is circulated in the second temperature adjustment circuit, and the heat medium is circulated in the first temperature adjustment circuit in a state in which the heating device is capable of heating the heat medium, so that the battery can be heated with priority at an early stage.

(7) The vehicle according to (5),
in which the control device is configured to,
in the separate mode, when the first temperature becomes equal to or lower than a sixth threshold value (sixth threshold value TH6) and the second temperature becomes equal to or lower than a seventh threshold value (seventh threshold value TH7), bring the first heat exchange unit to be in a state in which heat exchange between the heat medium and the heat medium for air conditioning is impossible,
when a difference between the fourth temperature and the second temperature is equal to or less than a predetermined value (predetermined value Δt), shift to the series mode, and
when the difference between the fourth temperature and the second temperature is larger than the predetermined value, cause the heat medium to be circulated in the first temperature adjustment circuit in a state in which the first heat exchange unit is not capable of exchanging heat between the heat medium and the heat medium for air conditioning in the separate mode.

According to (7), when the mode is shifted to the series mode when the difference between the fourth temperature and the second temperature is large, the temperature of the cooled heat medium of the first temperature adjustment circuit is heated under an influence of the heat medium of the second temperature adjustment circuit, but the transition to the series mode is permitted when the difference between the fourth temperature and the second temperature becomes equal to or less than the predetermined value, so that it is possible to suppress the temperature of the heat medium of the first temperature adjustment circuit from being heated under the influence of the heat medium of the second temperature adjustment circuit.

(8) The vehicle according to (6),
in which the control device is configured to,
in the separate mode, when the first temperature becomes equal to or higher than an eighth threshold value (eighth threshold value TH8) and the second temperature becomes equal to or higher than a ninth threshold value (ninth threshold value TH9), bring the heating device to be in a state in which the heat medium is not capable of being heated,
when a difference between the fourth temperature and the second temperature is equal to or less than a predetermined value (predetermined value Δt), shift to the series mode, and
when the difference between the fourth temperature and the second temperature is larger than the predetermined value, cause the heat medium to be circulated in the first temperature adjustment circuit in a state in which the heating device is not capable of heating the heat medium in the separate mode.

According to (8), when the mode is shifted to the series mode when the difference between the fourth temperature and the second temperature is large, the temperature of the heated heat medium of the first temperature adjustment circuit is cooled under an influence of the heat medium of the second temperature adjustment circuit, but the transition to the series mode is permitted when the difference between the fourth temperature and the second temperature becomes equal to or less than the predetermined value, so that it is possible to suppress the temperature of the heat medium of the first temperature adjustment circuit from being cooled under the influence of the heat medium of the second temperature adjustment circuit.

(9) The vehicle according to any one of (1) to (8),
in which the control device is configured to,
when the vehicle is started, select the separate mode, and
in the separate mode, cause the heat medium to be circulated only in the second temperature adjustment circuit (separate basic mode).

According to (9), the control device selects the separate mode when the vehicle is started and causes the heat medium to be circulated only in the second temperature adjustment circuit, so that it is possible to rapidly cope with the cooling accompanied by a sudden load at the time of starting the vehicle. In addition, the load of the second pump at the time of starting the vehicle can be reduced.

(10) The vehicle according to any one of (1) to (9), further including:
a charger (charger 3) configured to charge the battery,
wherein the charger is disposed in the first temperature adjustment circuit, and
wherein the control device is configured to, during charging of the battery, cause the heat medium to be circulated in the first temperature adjustment circuit in a state in which the first heat exchange unit is not capable of exchanging heat between the heat medium and the heat medium for air conditioning in the series mode or the separate mode.

According to (10), the battery, the charger, and the power conversion device can be appropriately cooled in the separate mode or the series mode while suppressing the power consumption associated with an operation of the first heat exchange unit during the charging of the battery and suppressing a long charging time.

REFERENCE SIGNS LIST 1 temperature adjustment circuit
2 battery 3 charger
4 first temperature adjustment circuit
5 power conversion device
6 second temperature adjustment circuit
7 coupling circuit
8 first coupling passage (coupling passage)
9 second coupling passage (coupling passage)
10 control device
11 chiller (first heat exchange unit)
12 radiator (second heat exchange unit)
17 heater (heating device)
100 vehicle
EWP1 first pump
EWP2 second pump
EWV1 first electromagnetic switching valve (switching unit)
S1 first temperature sensor (first temperature acquisition unit)
S2 second temperature sensor (second temperature acquisition unit)
S3 third temperature sensor (third temperature acquisition unit)
S4 fourth temperature sensor (fourth temperature acquisition unit)
MapI basic control map
MapII special control map

The invention claimed is:

1. A vehicle comprising:
a battery;
an air conditioner;
a first temperature adjustment circuit including a first pump configured to supply a heat medium to the battery and a first heat exchange unit configured to exchange heat between the heat medium and a heat medium for air conditioning;
a second temperature adjustment circuit including a second pump configured to supply the heat medium to a power conversion device and a second heat exchange unit configured to exchange heat between the heat medium and an outside air;
a coupling passage configured to connect the first temperature adjustment circuit and the second temperature adjustment circuit to form a coupling circuit;
a switching unit configured to switch between a circulation state, in which the heat medium is capable of circulating through the coupling circuit, and a non-circulation state, in which the heat medium is not capable of circulating through the coupling circuit;
a first temperature acquisition unit configured to acquire a first temperature which is a temperature of the battery; and
a control device configured to select any one mode of a plurality of modes based on at least the first temperature,
wherein the plurality of modes include:
a series mode in which, in the circulation state, the heat medium is circulated in the coupling circuit in a state in which the first heat exchange unit is not capable of exchanging heat between the heat medium and the heat medium for air conditioning; and
a separate mode in which the heat medium is circulated at least in the second temperature adjustment circuit in the non-circulation state,
wherein the control device includes a plurality of control maps,
wherein the plurality of control maps include:
a basic control map including the series mode and the separate mode; and
a special control map including the series mode and the separate mode, the special control map having an area of the series mode narrower than the basic control map, and
wherein the control device is configured to,
when the first temperature is within a predetermined temperature range, perform a control based on the basic control map, and
when the first temperature is out of the predetermined temperature range, perform a control based on the special control map, and after the series mode of the special control map is selected, perform a control based on the basic control map.

2. The vehicle according to claim 1, further comprising:
a second temperature acquisition unit configured to acquire a second temperature which is a temperature of the heat medium at an inlet of the battery;
a third temperature acquisition unit configured to acquire a third temperature which is a temperature of the power conversion device; and
a fourth temperature acquisition unit configured to acquire a fourth temperature which is a temperature of the heat medium at an inlet of the power conversion device,
wherein the control device selects any one mode of the plurality of modes in accordance with the first temperature, the second temperature, the third temperature, and the fourth temperature.

3. The vehicle according to claim 2,
wherein the control device prohibits the series mode regardless of the plurality of control maps when the third temperature is higher than a first threshold value.

4. The vehicle according to claim 2,
wherein in the basic control map, an area, where the fourth temperature is equal to or higher than a second threshold value and equal to or lower than a third threshold value, is corresponding to a condition area, where the series mode is selected regardless of the first temperature.

5. The vehicle according to claim 4,
wherein when the first temperature is higher than a fourth threshold value, the control device is configured to perform a control using the special control map, and
wherein in the separate mode of the special control map, the control device is configured to cause the heat medium to be circulated in the second temperature adjustment circuit, and cause the heat medium to be circulated in the first temperature adjustment circuit in a state in which the first heat exchange unit is capable of exchanging heat between the heat medium and the heat medium for air conditioning.

6. The vehicle according to claim 4 or 5,
wherein the first temperature adjustment circuit includes a heating device configured to heat the heat medium,
wherein when the first temperature is lower than a fifth threshold value, the control device is configured to perform a control using the special control map, and
wherein in the separate mode, the control device is configured to cause the heat medium to be circulated in the second temperature adjustment circuit, and cause the heat medium to be circulated in the first temperature adjustment circuit in a state in which the heating device is capable of heating the heat medium.

7. The vehicle according to claim 5,
wherein the control device is configured to, in the separate mode, when the first temperature becomes equal to or lower than a sixth threshold value and the second temperature becomes equal to or lower than a seventh threshold value, bring the first heat exchange unit to be in a state in which heat exchange between the heat medium and the heat medium for air conditioning is impossible, when a difference between the fourth temperature and the second temperature is equal to or less than a predetermined value, shift to the series mode, and when the difference between the fourth temperature and the second temperature is larger than the predetermined value, cause the heat medium to be circulated in the first temperature adjustment circuit in a state in which the first heat exchange unit is not capable of exchanging heat between the heat medium and the heat medium for air conditioning in the separate mode.

8. The vehicle according to claim 6,
wherein the control device is configured to,
in the separate mode, when the first temperature becomes equal to or higher than an eighth threshold value and the second temperature becomes equal to or higher than a ninth threshold value, bring the heating device to be in a state in which the heat medium is not capable of being heated, when a difference between the fourth temperature and the second temperature is equal to or less than a predetermined value, shift to the series mode, and when the difference between the fourth temperature and the second temperature is larger than the predetermined value, cause the heat medium to be circulated in the first temperature adjustment circuit in a state in which the heating device is not capable of heating the heat medium in the separate mode.

9. The vehicle according to claim 1,
wherein the control device is configured to,
when the vehicle is started, select the separate mode, and
in the separate mode, cause the heat medium to be circulated only in the second temperature adjustment circuit.

10. The vehicle according to claim 1, further comprising:
a charger configured to charge the battery,
wherein the charger is disposed in the first temperature adjustment circuit, and
wherein the control device is configured to, during charging of the battery, cause the heat medium to be circulated in the first temperature adjustment circuit in a state in which the first heat exchange unit is not capable of exchanging heat between the heat medium and the heat medium for air conditioning in the series mode or the separate mode.

* * * * *